United States Patent [19]
Aske

[11] Patent Number: 5,092,173
[45] Date of Patent: Mar. 3, 1992

[54] SECONDARY ACCELEROMETER PICKOFF

[75] Inventor: Vernon H. Aske, Minnetonka, Minn.

[73] Assignee: Honeywell Inc., Minneapolis, Minn.

[21] Appl. No.: 459,397

[22] Filed: Dec. 29, 1989

[51] Int. Cl.⁵ .................... G01P 15/13; G01P 15/12
[52] U.S. Cl. ..................... 73/517 B; 73/651
[58] Field of Search ............. 73/654, 517 B, 651, 73/517 R

[56] References Cited

U.S. PATENT DOCUMENTS

| | | |
|---|---|---|
| 4,094,199 | 6/1978 | Holdren et al. . |
| 4,131,020 | 12/1978 | Hugli et al. . |
| 4,346,597 | 8/1982 | Cullen . |
| 4,430,895 | 2/1984 | Colton . |
| 4,483,194 | 11/1984 | Rudolf ............................. 73/517 R |
| 4,488,445 | 12/1984 | Aske ................................ 73/517 R |
| 4,498,342 | 2/1985 | Aske . |
| 4,553,436 | 11/1985 | Hansson . |
| 4,611,491 | 9/1986 | Brown et al. ..................... 73/517 B |
| 4,660,418 | 4/1987 | Greenwood et al. . |
| 4,712,427 | 12/1987 | Peters et al. . |
| 4,926,689 | 5/1990 | Hanson ............................. 73/517 B |
| 4,932,261 | 6/1990 | Henrion ............................ 73/517 B |

Primary Examiner—John E. Chapman
Attorney, Agent, or Firm—Robert A. Pajak

[57] ABSTRACT

An accelerometer apparatus capable of sensing accelerations ranging from steady state to at least 500 Hertz is described. The apparatus uses a piezo resistive pickoff for low frequency sensing and applies a potential to the accelerometer's pendulum to excite a secondary pickoff for frequencies above 100 Hertz.

9 Claims, 5 Drawing Sheets

SECONDARY ACCELEROMETER PICKOFF

FIELD OF THE INVENTION

This invention relates to accelerometers. More particularly, this invention relates to apparatus for and a method of measuring acceleration from steady state to 500 Hertz and preferably beyond.

BACKGROUND OF THE INVENTION

It is well known to use accelerometers for navigation of aircraft, rockets, and guided weaponry such as missiles. Also, it is known to use silicon in accelerometers and to use a dual range accelerometer.

U.S. Pat. No. 4,346,597 teaches an accelerometer including a mass supported on a cantilevered beam with stops on either side. For the case of low acceleration, the beam acts as a cantilever while at high acceleration, the beam is caused to flex as a beam supported at both ends. This invention is capable of detecting accelerations in two different ranges.

Other U.S. patents teach accelerometers of dual range acceleration detection. In U.S. Pat. No. 4,611,491, a system is disclosed which provides a low-frequency inertial quality force feedback accelerometer as well as a high-frequency accelerometer. The high-frequency accelerometer is typically a piezo electric accelerometer. U.S. Pat. No. 4,712,427 discloses a dual sensor, frequency output accelerometer. The reference teaches an accelerometer having a first sensor which produces an output signal $S_1$ with a frequency $F_1$ and a second sensor which provides an output signal $S_2$ with a frequency $F_2$. The sensors are arranged so that a given acceleration causes the frequency of the one output signal to increase while the frequency of the other output signal decreases.

Several U.S. patent disclose silicon accelerometer. U.S. Pat. No. 4,660,418 discloses a flexible hinge device comprising a laminar silicon body having a groove portion etched away so as to define a thin flexible strip joining two rigid end pieces. A piezo resistive accelerometer is disclosed U.S. Pat. No. 4,430,895. The device is formed by etching a silicon wafer to form individual acceleration sensing elements. In U.S. Pat. No. 4,553,436, a silicon accelerometer is disclosed which employs the piezo resistive effect to measure the flexure of semiconductor beams supporting a semiconductor mass.

The accelerometers disclosed in U.S. Pat. Nos. 4,131,020 and 4,094,199 disclose a capacitive pick-off Also of note in these two patents is FIG. 14 which teaches a circuit having a high pass filter built into it. The present invention has a high pass filter as an equivalent circuit for the disclosed accelerometer. The high pass filter is built into FIG. 14 as capacitor 352 and resistor 354, but since this drawing also has a low pass filter built in, it operates as a band pass filter.

It is an object of the present invention to successfully measure acceleration from steady state to 500 Hertz and beyond. Known piezo resistive methods involve going through a 180° phase shift between 200 and 500 Hertz which is undesirable. A solution to this problem is to use the piezo resistive pickoff for low frequency response, less than 100 Hertz, and to use a secondary pickoff for response above 100 Hertz.

The integrated silicon accelerometer, as disclosed in U.S. Pat. No. 4,488,445, is a precision accelerometer for navigation of aircraft, rockets, or missiles. The teachings of commonly assigned U.S. Pat. Nos. 4,488,445 and 4,498,342 are hereby incorporated by reference.

SUMMARY OF THE INVENTION

The present invention is an integrated silicon accelerometer whose active element is a sensor capsule which comprises a silicon sensor die and two silicon stops. It is desirable for the apparatus to measure acceleration over a rang from steady state to 500 Hertz and beyond. To do this, a piezo resistive pickoff is utilized for the low frequency response, and for the high frequency response detection, a secondary pickoff is used.

The secondary pickoff is easily built into the integrated silicon accelerometer by using one stop of the sensor as one plate of a capacitor and the moving pendulum as the other plate of the capacitor.

Applying a voltage excites a torquer coil which can provide a restraint identical to mechanical damping. It is also advantageous to have high loop gain so as to limit vibration rectification at frequencies below 500 Hertz. By shifting the phase of the pickoff, the pickoff can be used in a secondary loop as a pickoff having very little phase shift relative to the pendulum motion.

Other objects, features, characteristics and methods of operation of the present invention will become apparent upon consideration of the following description and appended claims with reference to the accompanying drawings, all of which form a part of this specification.

BRIEF DESCRIPTION OF THE DRAWINGS

The advantages of the present invention may be appreciated for studying the following detailed description of the presently preferred exemplary embodiment together with the drawings in which.

DETAILED DESCRIPTION OF THE PRESENTLY PREFERRED EXEMPLARY EMBODIMENT

Figure 3A:
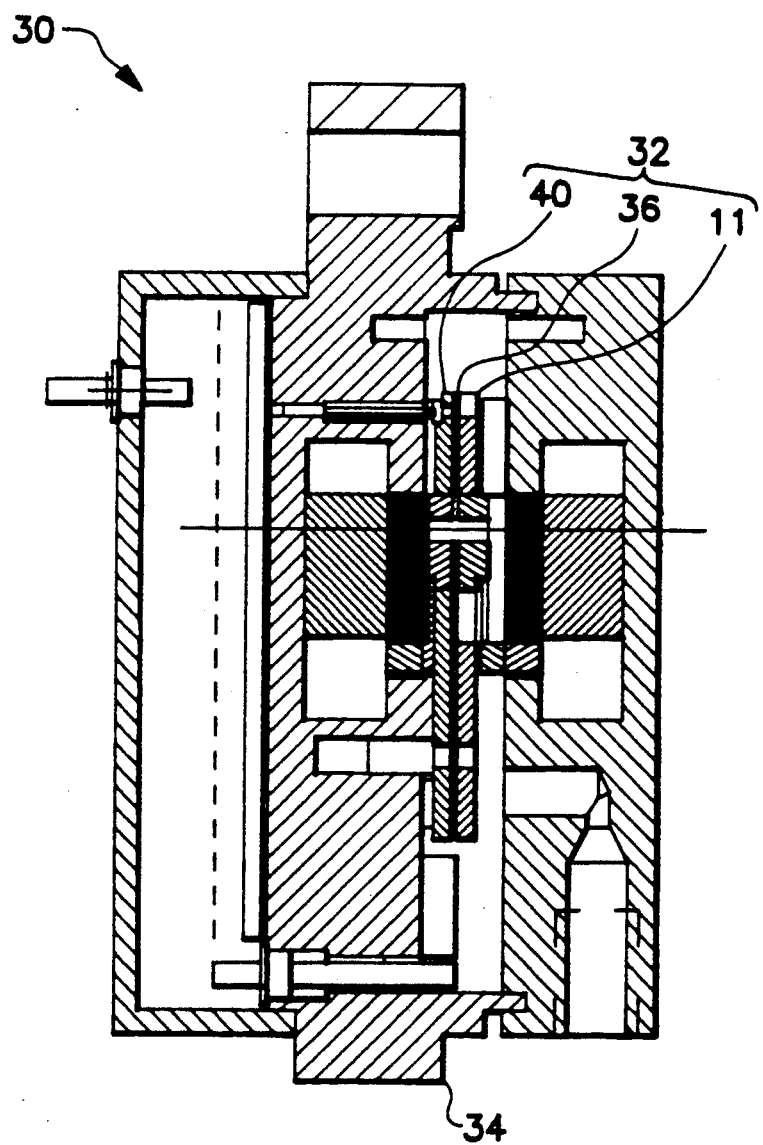
FIG. 3A is a sectional view of an accelerometer using the present invention.

An accelerometer in which the present invention can be used is shown in FIG. 3A. The accelerometer, generally shown at 30 is a precision accelerometer for use in aircraft, rocket, or missile navigation. The accelerometer 30 contains a sensor capsule 32 mounted to housing 34 usually made of material such as stainless steel. Sensor capsule 32 comprises a silicon sensor die 36 and a top stop 11 and a bottom stop 40. Sensor die 36 shown in FIG. 3B has a pendulum 38 to which rebalance coils 42 are attached on the top and bottom of pendulum 38. The top rebalance coil 42 can be seen in FIG. 3B. Pendulum 38 is supported by four flexures 44, 46, 48, 50. Two flexures, 48 and 50, have implanted piezo resistive elements which measure the stress in flexures 48 and 50. Support plate 52 is substantially U-shaped and encloses pendulum 38. Other numbers of flexures and piezo resistive elements may be used.

A requirement for this accelerometer is that it measure acceleration from steady state to 500 Hertz and higher. There should be no more than a 10° phase shift at 100 Hertz, and loop gain should be sufficiently high so as to limit vibration rectifications at frequencies below 500 Hertz. Because the piezo resistive pickoff goes through a 180° phase shift in the 200 to 500 Hertz range and continues to shift to 360° at approximately 1000 Hertz, it is difficult to obtain a response. The solution to this problem is to use the piezo resistive pickoff for frequencies below 100 Hertz and to utilize a secondary pickoff for response above 100 Hertz.

Figure 1:
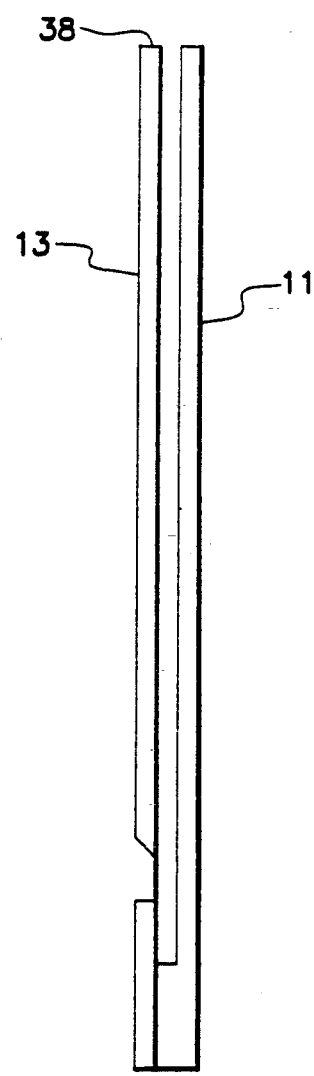
FIG. 1 is a perspective view of how the top stop and the pendulum are used as a capacitor in the present invention.
Figure 2:
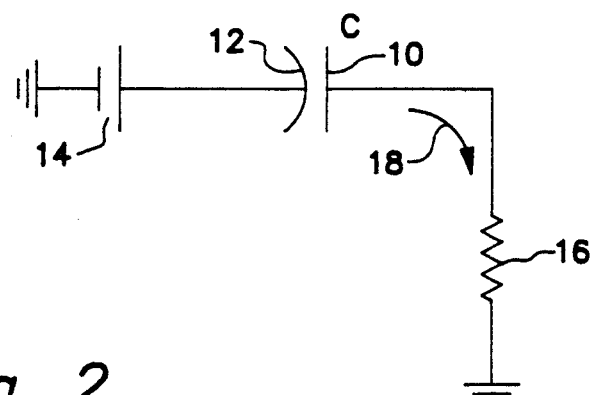
FIG. 2 is the equivalent diagrammatic electrical circuit to the structure shown in FIG. 1.
Figure 3B:
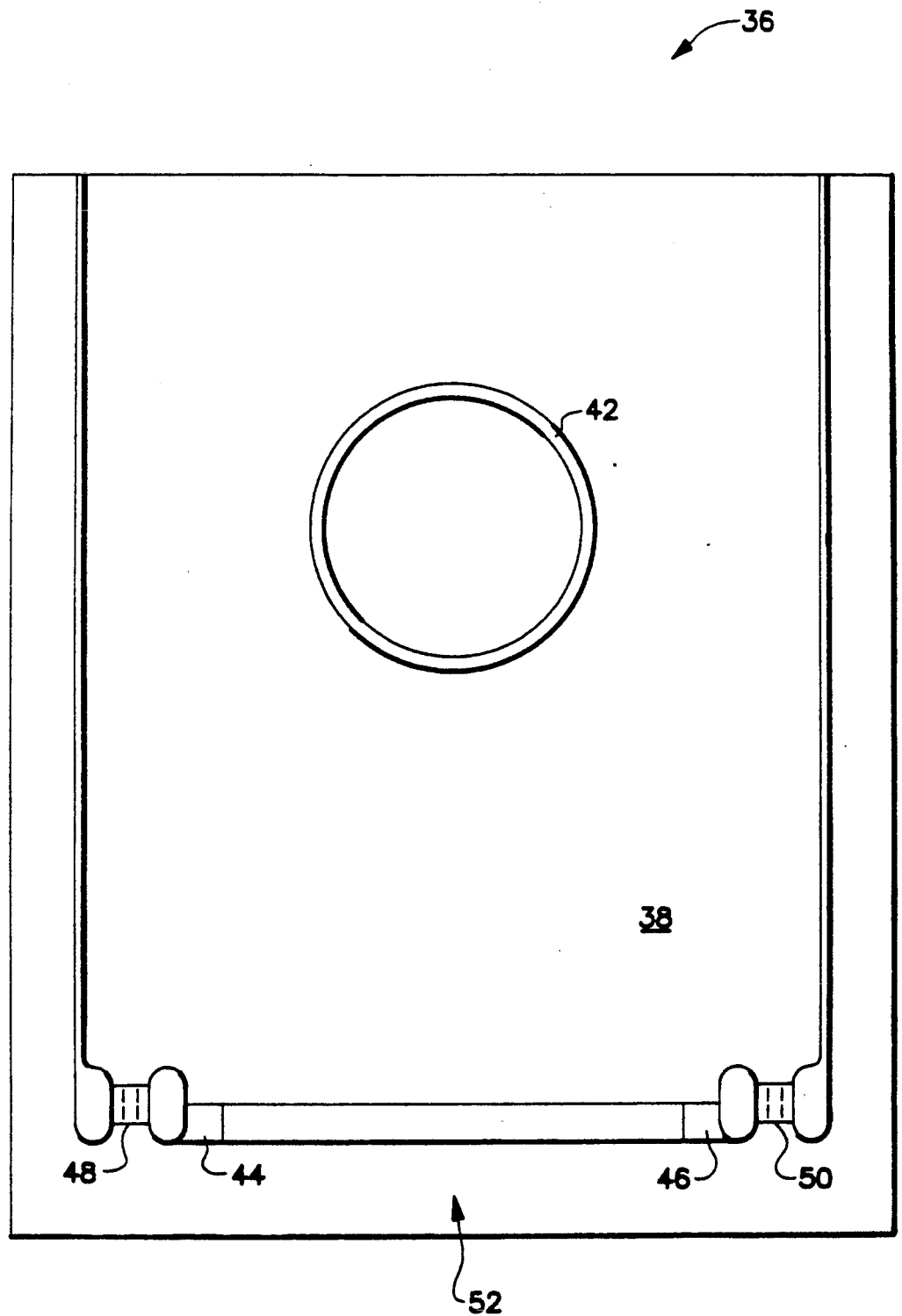
FIG. 3B is a front view of the silicon sensor die.

The secondary pickoff can be implemented in the accelerometer shown in FIGS. 3A and 3B. As can be seen in FIG. 1, the top stop 11 can be used as one plate of a capacitance pickoff and the moving pendulum 38 of FIG. 3B as another plate. The "N" epitaxial layer 13 of pendulum 38 is adjacent to the top stop 11 and is held at a 5 volt potential. FIG. 2 depicts a circuit equivalent to the structure of FIG. 1. Power source 14 holds plate 12 of capacitor C at a set voltage. In this case the set voltage is 5 volts. Plate 12 of capacitor C corresponds to the "N" epitaxial layer of the pendulum as shown in FIG. 1. Plate 10 of capacitor C corresponds to the top stop 11 shown in FIG. 1. The 5 volts (D.C.) on plate 12 serve as excitation for the pickoff. Direct current (D.C.) can be used because the time varying capacitance provides charge transfer to the load resistance 16. The current through the load resistance 16 flows in the direction of arrow 18. For a sinusoidal movement of the pendulum, the current through the load resistance 16 is directly proportional to frequency and cos (wt) as will be demonstrated below. It is well known that the charge, q, on a capacitor is equal to the capacitance, C, times the voltage, e:

$$q = Ce_c \quad (1)$$

It is also known that the derivative of charge with respect to time is equal to current, so:

$$dq/dt = i \quad (2)$$

Therefore, combining equations (1) and (2) we find that:

$$q = idt = Ce_c \quad (3)$$

Differentiating equation (3) with respect to time yields:

$$i = e_c dc/dt \quad (4)$$

Knowing that the capacitance varies sinusoidally and has a nominal capacitance K, peak amplitude A and Frequency w, the capacitance can be expressed as:

$$C = KA \sin wt \quad (5)$$

and $$dc/dt = KAw \cos wt \quad (6)$$

Substituting equation (6) into equation (4), it is shown that the current i depends on frequency and cos wt:

$$i = e_c KAw \cos wt \quad (7)$$

The voltage, which leads the pendulum motion by 90 degrees is directly proportional to the frequency, is used to excite the torquer coil to provide a restraint identical to mechanical damping. The pickoff can therefore provide an electrical damping signal. B shifting the phase of the pickoff, it can be used in a secondary loop as a pickoff which has very little phase shift relative to the pendulum motion. This permits a secondary loop with extended frequency response.

To mechanize this concept is fairly simple. The top stop 11 is used as the secondary pickoff. A conducting lead to the top stop is necessary as is an amplifier. The signal is summed into a loop in order to provide extended frequency response.

Figure 4:
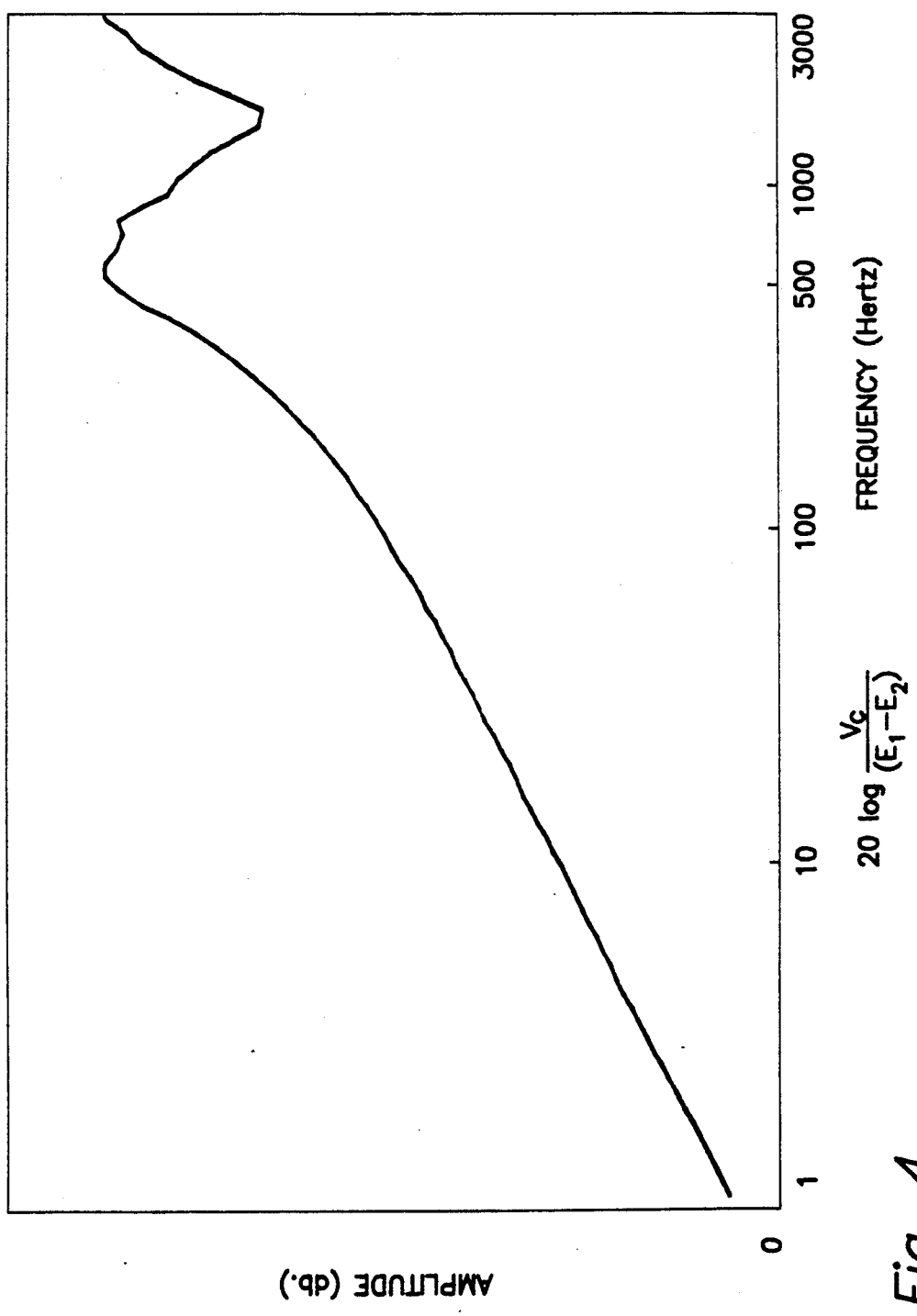
FIG. 4 is a graphic comparison of a pickoff voltage to a piezo resistive bridge voltage.

As shown in FIG. 4, the pickoff voltage ($V_c$) is compared to the voltage from a piezo resistive bridge ($E_1-E_2$). Note that the amplitude of the signal increases with frequency.

Figure 5:
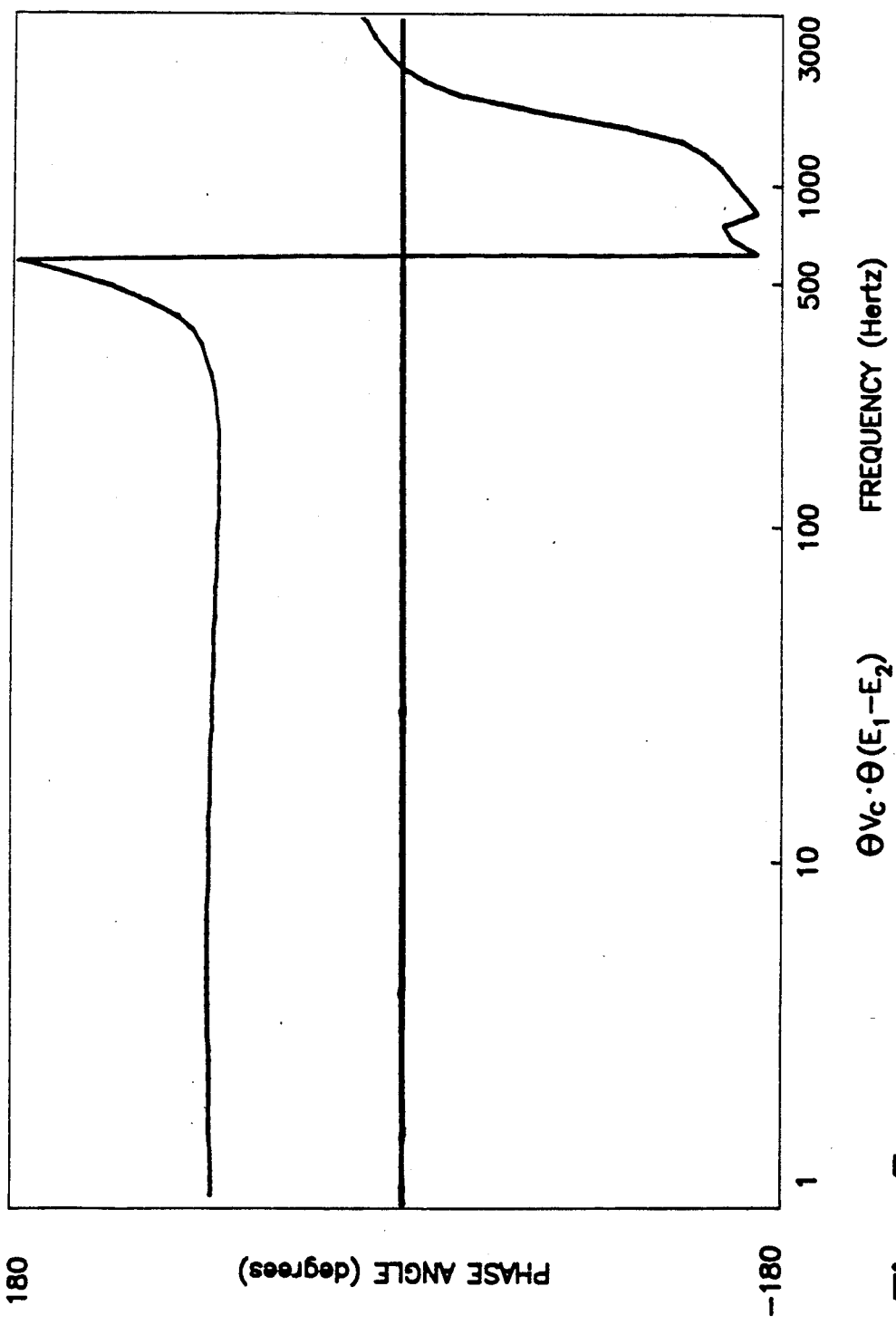
FIG. 5 is a graphic comparison of a pickoff phase to a piezo resistive bridge phase.

FIG. 5 compares the phase of the pickoff voltage to the phase of the piezo resistive bridge.

At low frequencies $V_C$ leads the piezo resistive signal by 90°. At 1000 Hertz, the pickoff voltage leads the piezo resistive bridge voltage by about 360°. This happens because the piezo resistive signal lags the pendulum at high frequencies. The pickoff provides a large signal at high frequencies and provides a signal which leads the pendulum by 90° over an extended frequency range.

While the invention has been described in connection with what is presently considered to be the most practical and preferred embodiment, it is to be understood that the invention is not limited to the disclosed embodiment, but is intended to cover various modifications and equivalent arrangements included within the spirit and scope of the appended claims. For example, rebalance can be effected either electrostatically or electromagnetically.

The embodiments of an invention in which an exclusive property or right is claimed are defined as follows:

1. An accelerometer capable of measuring acceleration from steady state to at least 500 Hertz, said acceleration comprising:
   a sensor capsule for sensing acceleration including a silicon sensor die and a top and bottom stop, said die having a pendulum made of layers of silicon with a layer adjacent to said top stop being held at a steady potential which serves as excitation for a secondary pickoff which detects acceleration above 100 Hertz, rebalancing means attached to said pendulum and four flexures which support said pendulum, two of said four flexures having piezo resistive elements implanted therein for measuring stress in said two flexures; and a housing to which said sensor capsule is mounted by a mounting means.

2. The apparatus according to claim 1, wherein said rebalancing means includes rebalance coils mounted thereon to restore the pendulum to an original position.

3. The apparatus of claim 1 wherein the rebalancing means are electromagnetically driven.

4. The apparatus of claim 1 wherein the rebalancing means are electrostatically driven.

5. The apparatus as in claim 1 having four flexures, two of which have piezo resistive elements, said two flexures therein are offset form the remaining two flexures so as to provide compensation for cross axis acceleration.

6. An apparatus for detecting acceleration from steady state to at least 500 Hertz comprising:
   a piezo resistive pickoff, including flexures having piezo resistive elements which support a pendulum member of a silicon sensor die, for detecting accelerations below 100 Hertz; and a secondary pickoff for applying a steady potential to a silicon layer of said pendulum for detecting frequencies greater than 100 Hertz.

7. Apparatus for an accelerometer, said apparatus capable of sensing accelerations from steady state to at least 500 Hertz, said apparatus comprising:

a single pendulum member having a high frequency sensing means capable of sensing accelerations greater than 100 Hertz and low frequency sensing means capable of sensing accelerations up to 100 Hertz.

8. The apparatus as in claim 7 wherein said high frequency sensing means comprises:

a silicon layer of a pendulum member which is a part of a silicon sensor die of said accelerometer, said silicon layer serving to excite a secondary pickoff when a steady voltage is applied and functioning as one plate of a capacitor;

a top stop of a sensor capsule, said stop acting as a second plate of said capacitor; and said capacitor having a time varying, frequency dependent capacitance caused by sinusoidal motion of said pendulum.

9. The apparatus as in claim 7 wherein said low frequency sensing means comprises piezo resistive elements mounted in flexures of a silicon sensor die of a sensor capsule of said accelerometer.

* * * * *